(12) United States Patent
Sekiguchi et al.

(10) Patent No.: US 7,741,619 B2
(45) Date of Patent: Jun. 22, 2010

(54) SCINTILLATOR PANEL FOR RADIATION, AND FLAT PANEL DETECTOR

(75) Inventors: Mitsuru Sekiguchi, Tokyo (JP); Takehiko Shoji, Hachioji (JP)

(73) Assignee: Konica Minolta Medical & Graphic, Inc., Tokyo (JP)

(*) Notice: Subject to any disclaimer, the term of this patent is extended or adjusted under 35 U.S.C. 154(b) by 0 days.

(21) Appl. No.: 12/217,535

(22) Filed: Jul. 7, 2008

(65) Prior Publication Data

US 2009/0020706 A1      Jan. 22, 2009

(30) Foreign Application Priority Data

Jul. 18, 2007   (JP) ............... 2007-186776

(51) Int. Cl.
*G03B 42/08* (2006.01)
(52) U.S. Cl. .................. 250/484.4; 250/484.2
(58) Field of Classification Search ............ 250/361 R, 250/483.1, 484.2, 484.4
See application file for complete search history.

(56) References Cited

U.S. PATENT DOCUMENTS 7,112,802 B2 * 9/2006 Ogawa ............ 250/370.11

2003/0160185 A1 * 8/2003 Homme ............ 250/483.1
2004/0000644 A1 * 1/2004 Homme ............ 250/361 R

FOREIGN PATENT DOCUMENTS

JP      2003-262671 A      9/2003

* cited by examiner

*Primary Examiner*—David P Porta
*Assistant Examiner*—Mark R Gaworecki
(74) *Attorney, Agent, or Firm*—Frishauf, Holtz, Goodman & Chick, P.C.

(57) ABSTRACT

An objective is to provide a flat panel detector exhibiting high durability and less noise, which is fitted with a scintillator for radiation exhibiting high emission efficiency, wherein the scintillator is easy to be manufactured because of the simple structure. Also disclosed is a scintillator panel for radiation possessing a radiotransparent substrate and provided thereon, a phosphor layer from which light is emitted by exposing the substrate to radiation and a reflective film at which light from the phosphor layer is reflected, wherein the reflective film provided between the substrate and the phosphor layer possesses a multilayer film composed of at least two dielectric layers exhibiting a high reflectivity.

8 Claims, 5 Drawing Sheets

FIG. 7 ( a )
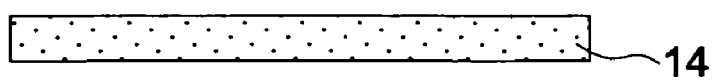
FIG. 7 ( b )
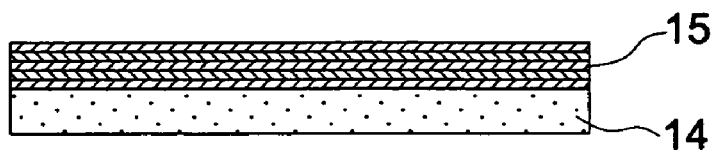
FIG. 7 ( c )
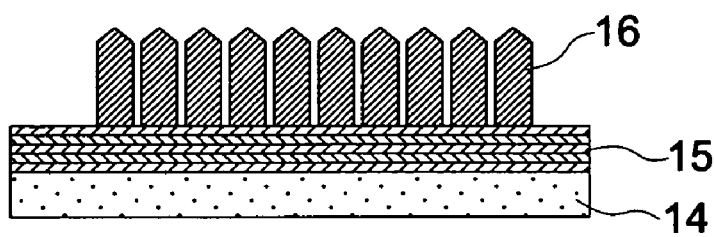
FIG. 7 ( d )
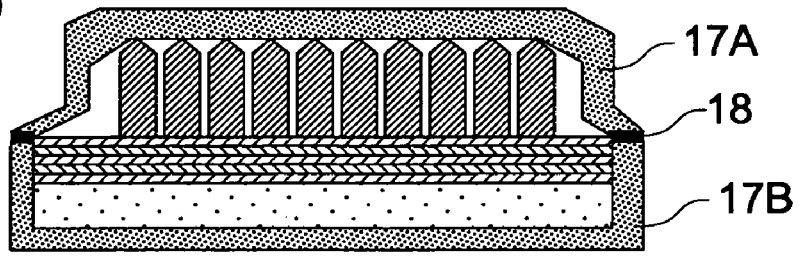

SCINTILLATOR PANEL FOR RADIATION, AND FLAT PANEL DETECTOR

This application claims priority from Japanese Patent Application No. 2007-186776 filed on Jul. 18, 2007, which is incorporated hereinto by reference.

TECHNICAL FIELD

The present invention relates to a scintillator panel for radiation generating fluorescence via exposure to radiation, and specifically to a scintillator panel for radiation possessing a reflective film exhibiting high reflection efficiency, and a flat panel detector.

BACKGROUND

Radiation imaging apparatuses such as X-ray imaging apparatuses have been used widely for diagnoses of medical conditions in medical sites. In particular, the radiation imaging apparatuses for an intensifying screen—X-ray film wherein high sensitivity and high image quality have been attained in a long history are still used in the medical sites all over the world.

In recent years, a digital type radiation image detector represented by a flat panel radiation detector (FPD) is also making an appearance, which makes it possible to obtain radiation images as digital information, to conduct image processing freely, or to transmit image information instantly.

The radiation image detector has a so-called "scintillator panel" that converts radiation into fluorescence. The scintillator panel is one that receives radiation transmitted through an object and emits instantly fluorescence having intensity corresponding to a dose of the radiation, and it has a structure in which a phosphor layer is formed on a substrate.

FIG. 2 shows a cross-sectional configuration diagram of a flat panel detector (FPD) possessing conventional scintillator panel 6. The scintillator panel is fitted with radiotransparent substrate 1, metal reflective film 2 formed on one of the substrate surfaces, protective film 3 covering the metal reflective film, an alkali halide phosphor layer formed on the protective film provided on the metal reflective film as a number of acicular crystals via evaporation (CsI:Tl in which Tl is doped as emission center), and external protective films 5A and 5B as moisture resistance layers covering the phosphor layer.

As shown in FIG. 2, scintillator panel 6 is closely brought into contact with photoelectric transducer array 7 and pressed with buffer material 8 on which front plane 9 for electromagnetic shielding is placed to subsequently seal the inside of PDF with housing 10.

X-ray passing through the affected area of a patient enters from the front plane 9 side of FPD, and is converted into light with phosphor 4. Light thereof is read by photoelectric transducer array 7 to obtain an image, but the same amount of light as light going the photoelectric transducer array side is also emitted on the front plane side, since light from phosphor 4 is isotropically emitted. Metal reflective film 2 serves to reflect light on the photoelectric transducer array side so as not to waste this emission.

Incidentally, protective film 3 covers one of the surfaces of the metal reflective film in FIG. 2. On the other hand, provided is a metal reflective film as well as a structure possessing a protective film covering up to at least the side wall of a substrate (refer to Patent Document 1, for example).

FIG. 3 shows a cross-sectional schematic diagram of a scintillator panel described in Patent Document 1. Reflective film 2 and substrate 1 are enclosed and covered by protective films 3 and 5.

The reason is as follows. The scintillator panel inside FPD is possibly exposed for a few days at high temperature and high humidity (a temperature of 60° C. and a humidity of 70%, for example). It is assumed in this case that a halogen element produces $I_3^-$ ion via water penetration in such a way that $CsI+I_2=Cs^++I_3^-$ since the phosphor contains the halogen element, and Al is positively ionized via reaction with the metal reflective film conventionally made of Al to be dissolved out of the metal reflective film. Or, possibly, it is also assumed that a hydroxide ion is generated via reaction with a $H_2O$ molecule by ionizing I in such a way that $H_2O+I^-\rightarrow HI+OH^-$, and at this time, Al is dissolved in the following reaction such that $Al+3OH^-=Al(OH)_3$.

There is a problem such that intensity unevenness is generated to an image since light reflection intensity is lowered at the portion where corrosion is generated.

Further, light generated at the portion other than the scintillator inside a flat panel detector strays into the inside of the scintillator (stray light), whereby noise is possibly made, or fluorescence is possibly generated by impurities other than Tl. Since light in this case becomes noise with respect to a diagnostic image, inherent light emission (CsI:Tl) of the scintillator exhibits a wavelength of 400-700 nm as shown in FIG. 4, and it is considered that noise can be suppressed if light other than the foregoing light is designed not to reflect at the reflective film.

(Patent Document 1) Japanese Patent O.P.I. Publication No. 2003-262671.

SUMMARY

It is an object of the present invention to provide a flat panel detector exhibiting high durability and less noise, which is fitted with a scintillator for radiation exhibiting high emission efficiency, wherein the scintillator is easy to be manufactured because of the simple structure.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 7(a) shows a cross-sectional diagram at the 1$^{st}$ step of manufacturing a scintillator panel for radiation in the first embodiment of the present invention;

FIG. 7(b) shows a cross-sectional diagram at the 2nd step of manufacturing a scintillator panel for radiation in the first embodiment of the present invention;

FIG. 7(c) shows a cross-sectional diagram at the 3rd step of manufacturing a scintillator panel for radiation in the first embodiment of the present invention;

FIG. 7(d) shows a cross-sectional diagram at the 4th step of manufacturing a scintillator panel for radiation in the first embodiment of the present invention;

DESCRIPTION OF THE PREFERRED EMBODIMENTS

The above object of the present invention is accomplished by the following structures.

(Structure 1) A scintillator panel for radiation comprising a radiotransparent substrate and provided thereon, a phosphor layer from which light is emitted by exposing the substrate to radiation and a reflective film at which light from the phosphor layer is reflected, wherein the reflective film provided between the substrate and the phosphor layer comprises a multilayer film composed of at least two dielectric layers exhibiting a high reflectivity.

(Structure 2) A scintillator panel for radiation comprising a radiotransparent substrate and provided thereon, a phosphor layer from which light is emitted by exposing the substrate to radiation and a reflective film at which light from the phosphor layer is reflected, wherein the reflective film provided on a substrate surface side opposite the phosphor layer comprises a multilayer film composed of at least two dielectric layers exhibiting a high reflectivity.

(Structure 3) The scintillator panel of Structure 1, wherein the reflective film reflects light having a wavelength of 350-800 nm.

(Structure 4) The scintillator panel of Structure 2, wherein the reflective film reflects light having a wavelength of 350-800 nm.

(Structure 5) The scintillator panel of Structure 3, wherein the reflective film reflects light having a wavelength of 400-700 nm.

(Structure 6) The scintillator panel of Structure 4, wherein the reflective film reflects light having a wavelength of 400-700 nm.

(Structure 7) A flat panel detector comprising the scintillator panel of Structure 1.

(Structure 8) A flat panel detector comprising the scintillator panel of Structure 2.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

The present invention will further be described in detail.

Figure 1:
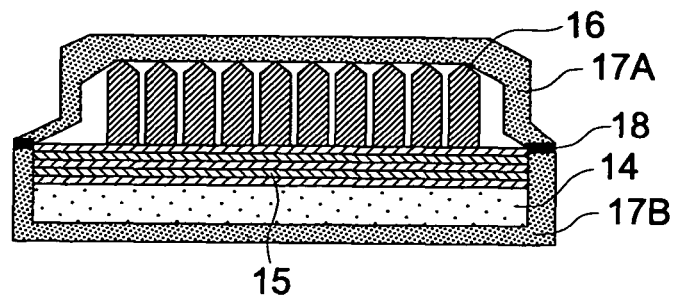
FIG. 1(a) shows a cross-sectional configuration diagram of a scintillator panel for radiation with the dielectric reflective film of the present invention.
FIG. 1(b) shows another cross-sectional configuration diagram of a scintillator panel for radiation with the dielectric reflective film of the present invention.
Figure 1:
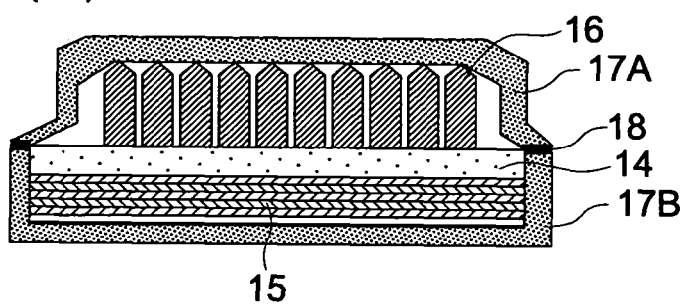
Figure 2:
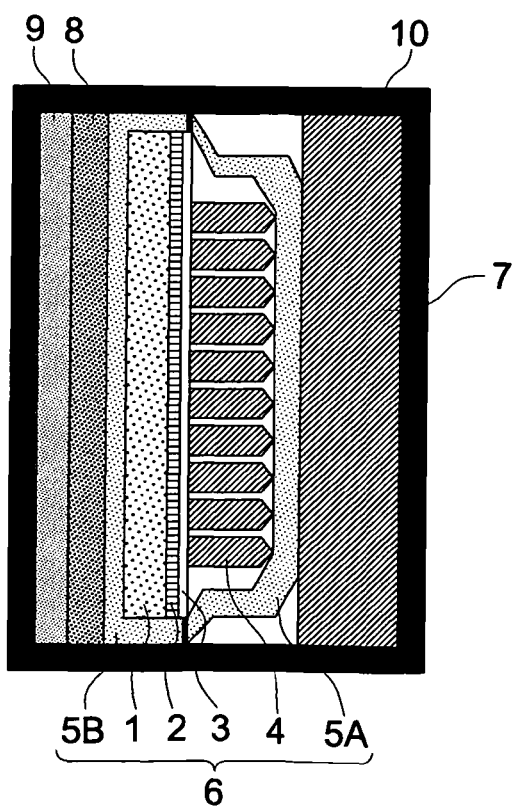
FIG. 2 shows a cross-sectional configuration diagram of a conventional flat panel detector.
Figure 3:
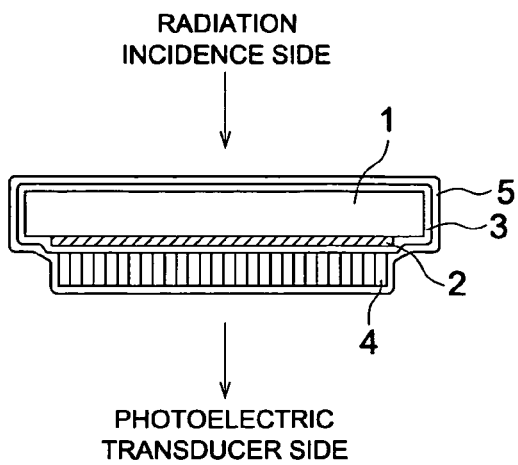
FIG. 3 shows a cross-sectional schematic diagram of a conventional scintillator panel for radiation.
Figure 4:
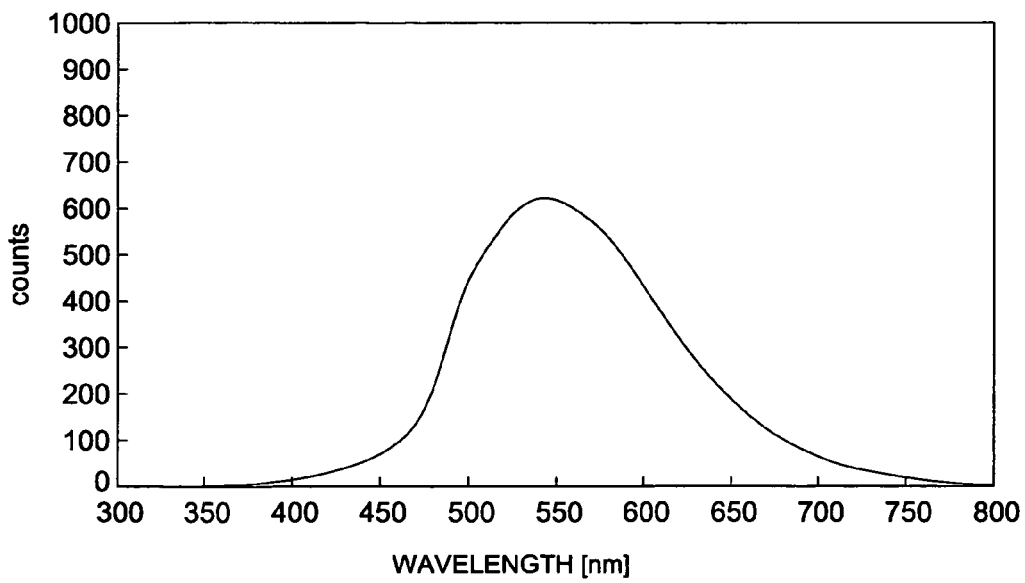
FIG. 4 shows an emission spectrum of a CsI scintillator.

FIG. 1(a) and FIG. 1(b) each show a cross-sectional configuration diagram of a scintillator panel for radiation in the present invention. In addition, numerals 14, 15, 16, 17A, 17B, 18 are designated as polyimide substrate, $TiO_2/SiO_2$ multilayer film, CsI:Tl phosphor, external protective film, external protective film and external protective film connection portion, respectively.

FIG. 1(a) shows the configuration described in Structure 1, and disclosed is a scintillator panel for radiation possessing a radiotransparent substrate and provided thereon, a phosphor layer from which light is emitted by exposing the substrate to radiation and a reflective film at which light from the phosphor layer is reflected, wherein the reflective film provided between the substrate and the phosphor layer possesses a multilayer film composed of at least two dielectric layers.

FIG. 1(b) shows the configuration described in Structure 2, and disclosed is a scintillator panel for radiation possessing a radiotransparent substrate and provided thereon, a phosphor layer from which light is emitted by exposing the substrate to radiation and a reflective film at which light from the phosphor layer is reflected, wherein the reflective film provided on a substrate surface side opposite the phosphor layer possesses a multilayer film composed of at least two dielectric layers.

As shown in the foregoing figures, since the reflective film of the present invention possesses a multilayer film composed of dielectric layers, separation and protection of the reflective film and the phosphor can be avoided, and the reflective film exhibits simple configuration and easy production.

Figure 5:
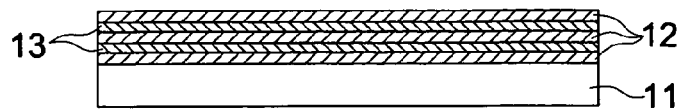
FIG. 5 shows a schematic diagram of the dielectric reflective film.

In the present invention, a reflection mirror composed of a multilayer having dielectric layers is formed in place of a metal reflective film and a protective film. A structure of the reflection mirror is shown in FIG. 5. In this case, a plurality of $TiO_2$ layers 11 and $SiO_2$ layers 12 are laminated on glass substrate 13. Two kinds of thin films exhibiting high refractive index and low refractive index are alternately formed via evaporation to make an optical thickness of $\lambda_0/4$. Herein, $\lambda_0$ is expressed by $\lambda_0 = \lambda/n$, and $\lambda_0$ is an optical wavelength inside an evaporated material exhibiting refractive index n. In view of vertical incidence, high refractive index ($TiO_2$:2.35) layers and low refractive index ($SiO_2$:1.42) layers are alternately provided as shown in FIG. 5. When light having wavelength $\lambda$ enters here, the phase of reflected light is reversed at the interface where light enters from a high refractive index material to a low refractive index material. In contrast, since light is reflected with an identical phase at the interface where light enters from a low refractive index material to a high refractive index material, Fresnel reflection coefficient at each interface becomes alternately positive and negative, and the optical path difference of each film becomes $\pi$. As a result, reflected light with respect to light having a wavelength of $\lambda$ produces the identical phase at all of the interfaces, whereby superimposed reflected light thereof exhibits high reflectivity. Incidentally, in cases where the total number of layers are approximately over 10, a high reflectivity of approximately 99.99% can be obtained in theory.

The above-described reflection mirror structure is to be prepared employing $TiO_2$ exhibiting a refractive index of 2.35 and $SiO_2$ exhibiting a refractive index of 1.42. Assuming that $\lambda$ is a CsI emission center wavelength of 550 nm, since a $TiO_2$ optical thickness of $\lambda_0/4$ is to be $\lambda_0/4$ n=550/(4×2.35)=59 nm, and a $SiO_2$ optical thickness of $\lambda_0/4$ is to be $\lambda/4$ n=550/(4×

1.42)=97 nm, a TiO$_2$ layer having a thickness of 59 nm and a SiO$_2$ layer having a thickness of 97 nm may be alternately laminated. Layer thickness of each layer is optimized so as to maximize reflectivity practically not only at a wavelength of 550 nm, but also at a wavelength of 400-700 nm employing simulation software such as TFCalc and so forth. Examples including these results are shown in Table 1.

TABLE 1

| Layer No. | Refractive index | Layer thickness (nm) |
|---|---|---|
| Air | 1.00 | — |
| 1 | 2.35 | 235 |
| 2 | 1.42 | 75 |
| 3 | 2.35 | 60 |
| 4 | 1.42 | 70 |
| 5 | 2.35 | 65 |
| 6 | 1.42 | 80 |
| 7 | 2.35 | 145 |
| 8 | 1.42 | 100 |
| 9 | 2.35 | 130 |
| 10 | 1.42 | 95 |
| 11 | 2.35 | 50 |
| 12 | 1.42 | 120 |
| 13 | 2.35 | 60 |
| 14 | 1.42 | 95 |
| 15 | 2.35 | 50 |
| 16 | 1.42 | 105 |
| 17 | 2.35 | 55 |
| 18 | 1.42 | 125 |
| 19 | 2.35 | 75 |
| 20 | 1.42 | 100 |
| 21 | 2.35 | 50 |
| 22 | 1.42 | 65 |
| 23 | 2.35 | 40 |
| 24 | 1.42 | 80 |
| 25 | 2.35 | 40 |
| 26 | 1.42 | 105 |
| 27 | 2.35 | 50 |
| 28 | 1.42 | 185 |
| 29 | 2.35 | 50 |
| 30 | 1.42 | 80 |
| 31 | 2.35 | 60 |
| Resin substrate | 1.52 | — |

Figure 6:
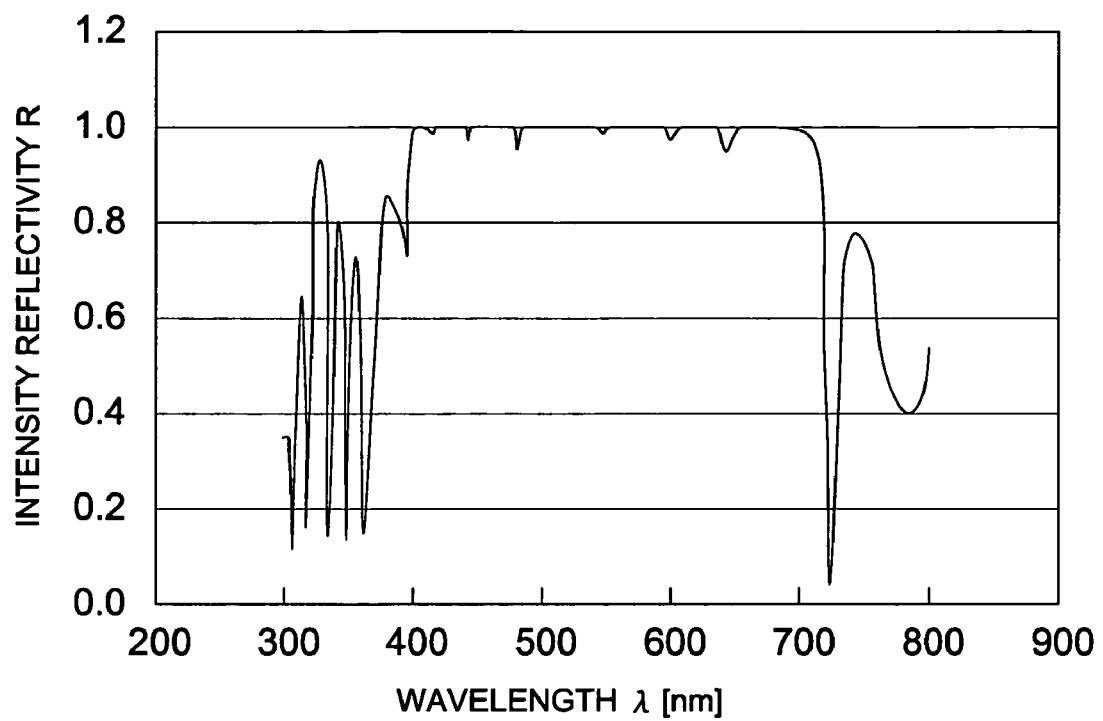
FIG. 6 shows a reflection spectrum of the dielectric reflective film shown in FIG. 5.

This example is on the structure of a reflection mirror with a refractive index of 2.35 and a refractive index of 1.42. A wavelength of 400-700 nm is the wavelength range in which high reflectivity is obtained. A multilayer structure composed of 31 layers is employed, and a TiO$_2$ (refractive index: 2.35) layer and a SiO$_2$ (refractive index:1.42) layer mainly having a thickness of 59 nm and a thickness of 97 nm, respectively are provided, and each of different layer thicknesses is designed to be employed. The substrate is made of glass and the medium is air, and calculated values of intensity reflectivity of a multilayer film are shown in FIG. 6. It is to be understood that high reflectivity is produced in a wavelength range of 400-700 nm.

In the case of the present invention, a protective film for a reflective film is omitted by forming a multilayer film composed of at least two dielectric layers exhibiting a high reflectivity in place of a metal reflective film by such the method described above.

EXAMPLE

The First Embodiment (Structure 1)

FIG. 7(*a*), FIG. 7(*b*), FIG. 7(*c*) and FIG. 7(*d*) each show a cross-sectional diagram at each step of manufacturing a scintillator panel for radiation in the first embodiment of the present invention. FIG. 7(*a*) will be first explained. Polyimide substrate 14 having a thickness of 125 μm was employed as a substrate. The polyimide substrate made from a resin has an advantage of high X-ray transmission.

Next, a reflective film composed of plural dielectric layers is prepared by an evaporation method or an ion plating method as shown in FIG. 7(*b*). TiO$_2$ layers each having a refractive index of 2.35 and SiO$_2$ layers each having a refractive index of 1.42 are laminated so as to give the layer thickness as shown in Table 1. Specifically, 31 layers are made. As the odd number TiO$_2$ layers each having a refractive index of 2.35, provided are a 1$^{st}$ layer having a thickness of 235 nm, a 3$^{rd}$ layer having a thickness of 60 nm, a 5$^{th}$ layer having a thickness of 65 nm, a 7$^{th}$ layer having a thickness of 145 nm, a 9$^{th}$ layer having a thickness of 130 nm, an 11$^{th}$ layer having a thickness of 50 nm, a 13$^{th}$ layer having a thickness of 60 nm, a 15$^{th}$ layer having a thickness of 50 nm, a 17$^{th}$ layer having a thickness of 55 nm, a 19$^{th}$ layer having a thickness of 75 nm, a 21$^{st}$ layer having a thickness of 50 nm, a 23$^{rd}$ layer having a thickness of 40 nm, a 25$^{th}$ layer having a thickness of 40 nm, a 27$^{th}$ layer having a thickness of 50 nm, a 29$^{th}$ layer having a thickness of 50 nm, and a 31$^{st}$ layer having a thickness of 60 nm. As the even number SiO$_2$ layers each having a refractive index of 1.42, also provided are a 2$^{nd}$ layer having a thickness of 75 nm, a 4$^{th}$ layer having a thickness of 70 nm, a 6$^{th}$ layer having a thickness of 80 nm, an 8$^{th}$ layer having a thickness of 100 nm, a 10$^{th}$ layer having a thickness of 95 nm, an 12$^{th}$ layer having a thickness of 120 nm, a 14$^{th}$ layer having a thickness of 95 nm, a 16$^{th}$ layer having a thickness of 105 nm, an 18$^{th}$ layer having a thickness of 125 nm, a 20$^{th}$ layer having a thickness of 100 nm, a 22$^{nd}$ layer having a thickness of 65 nm, a 24$^{th}$ layer having a thickness of 80 nm, a 26$^{th}$ layer having a thickness of 105 nm, a 28$^{th}$ layer having a thickness of 185 nm, and a 30$^{th}$ layer having a thickness of 80 nm.

Next, CsI:Tl as a phosphor material is deposited on a substrate via evaporation as shown in FIG. 7(*c*). Phosphor raw material CsI and TlI are first filled in a boat in a ratio of 1 mol %:0.03 mol %, for example. Next, after the inside of a vacuum chamber is evacuated once to introduce Ar gas, the inside of the vacuum chamber is made to be at a vacuum degree of 0.5 Pa. Herein, the substrate is heated approximately at 200° C. while rotating it, and the boat is heated up to approximately 710° C. to evaporate CsI and TlI. In this way, CsI columnar crystals each having a diameter of a few micron-meters are deposited on the substrate to form a 600 μm thick film on the substrate.

Finally, a lamination film of 20 μm thick PET/0.2 μm thick evaporated alumina/30 μm thick polypropylene having a total thickness of 50.2 μm is employed as each of external protective films 17A and 17B as shown in FIG. 7(*d*). The external protective film 17A end adheres to the external protective film 17B end via thermal compression bonding. The adhering portion is designated as external protective film connection portion 18.

The corrosion problem to be solved by the present invention is as follows. $I_3^-$ ion is produced by the following chemical equation $CsI+I_2=Cs^++I_3^-$, via water penetration at high temperature and humidity (a temperature of 60° C. and a humidity of 70%), and Al is positively ionized via reaction with the metal reflective film conventionally made of Al to be dissolved out of the metal reflective film. Or, possibly, it is also assumed that a hydroxide ion is generated via reaction with a H$_2$O molecule by ionizing I in such a way that $H_2O + I^- \rightarrow HI + OH^-$, and at this time, dissolution is generated in the following reaction such that $Al + 3OH^- = Al(OH)_3$. However, no corrosion is generated since the reflective film of the present invention is composed of not a metal film but a multilayer dielectric film.

Further, in the present invention, since the reflective film (TiO$_2$/SiO$_2$ multilayer film) reflects only light emission of phosphor, strayed-in noise (stray light) and noise caused by fluorescence generated by impurities other than Tl are not reflected at the reflective film, whereby image noise can be suppressed. The present invention has the advantage that formation of a protective layer is also unnecessary, wherein the protective layer has originally been provided in order to protect the metal reflective film from corrosion caused by diffusion of phosphor halide atoms.

The present invention also has the advantage that reflectivity of the reflective film of the present invention is roughly 100% as shown in FIG. 6, and can make higher than in the case of Al having a reflectivity of 87% and the case of Ag having a reflectivity of 94%, which can be realized by metal.

In the present embodiment, a multilayer structure composed of TiO$_2$ layers and SiO$_2$ layers is employed as the reflective film, but any material may be used as far as combination of a material having a high refractive index and a material having a low refractive index is concerned. As to the number of layers, at least a TiO$_2$ layer and a SiO$_2$ layer each may also be allowed to be used. Layer thickness of the TiO$_2$ layer and the SiO$_2$ layer each may be optimized by utilizing CsI having a refractive index of 1.8 and polyimide having a refractive index of 1.78. Also in the present embodiment, polyimide is employed for a substrate, but other substrates, for example, resin substrates such as polyethylene terephthalate (PET) substrates or the like, and metal substrates such as Al or the like may be allowed to be used as far as radiotransparency is concerned. A multilayer dielectric film described in the present embodiment is also provided on the substrate obtained by forming a metal refractive layer made of Al, Ag or the like on a resin substrate, and a phosphor layer may be formed thereon. Corrosion resistance is possibly degraded in cases where these metal substrate and metal refractive layer are employed, but since the reflective film (TiO$_2$/SiO$_2$ multilayer film) reflects only light emission of phosphor, strayed-in noise (stray light) and noise caused by fluorescence generated by impurities other than Tl are not reflected at the reflective film, whereby it is advantageous that image noise can be suppressed.

In addition, in the present embodiment, multilayer film of TiO$_2$/SiO$_2$ 15 adheres directly to polyimide substrate 14, but a metal reflective film such as an Al film or the like may be inserted between 15 and 14. In this case, reflectivity with respect to emission of CsI:Tl phosphor 16 is further possible to be raised.

The Second Embodiment (Structure 2)

Figure 8:
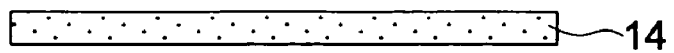
FIG. 8(a) shows a cross-sectional diagram at 1st step of manufacturing a scintillator panel for radiation in the second embodiment of the present invention.
FIG. 8(b) shows a cross-sectional diagram at 2nd step of manufacturing a scintillator panel for radiation in the second embodiment of the present invention.
FIG. 8(c) shows a cross-sectional diagram at 3rd step of manufacturing a scintillator panel for radiation in the second embodiment of the present invention.
FIG. 8(d) shows a cross-sectional diagram at 4th step of manufacturing a scintillator panel for radiation in the second embodiment of the present invention.
FIG. 8(e) shows a cross-sectional diagram at 5th step of manufacturing a scintillator panel for radiation in the second embodiment of the present invention.
Figure 8:
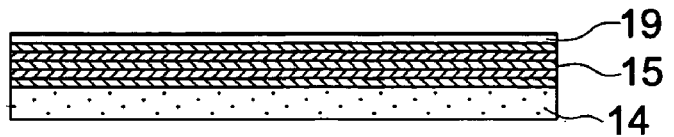
Figure 8:
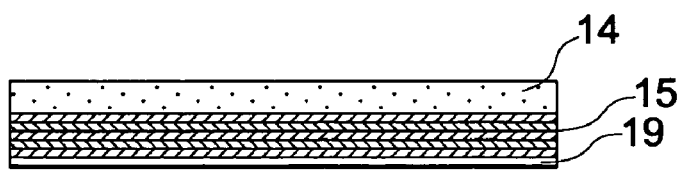
Figure 8:
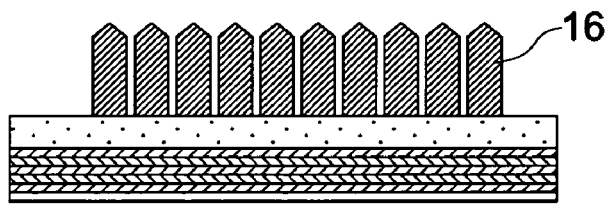
Figure 8:
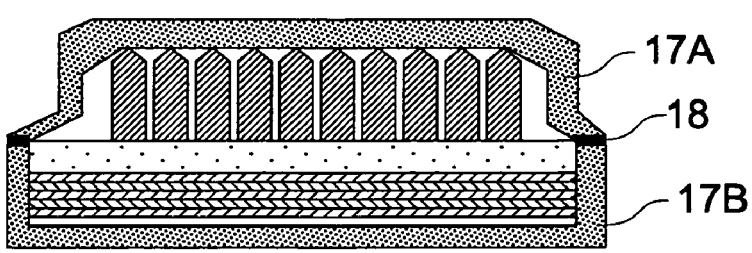

FIG. 8(a), FIG. 8(b), FIG. 8(c), FIG. 8(d) and FIG. 8(e) each show a cross-sectional diagram at each step of manufacturing a scintillator panel for radiation in the second embodiment of the present invention. FIG. 8(a) will be first explained. Polyimide substrate 14 having a thickness of 75 µm was employed as a substrate. A polyimide substrate also has a feature of being capable of transmitting light emitted from phosphor.

Next, a reflective film composed of plural dielectric layers is formed on polyimide substrate 14 by an evaporation method or an ion plating method as shown in FIG. 8(b) including PET film with an Al evaporated film 19. TiO$_2$ layers each having a refractive index of 2.35 and SiO$_2$ layers each having a refractive index of 1.42 are laminated so as to give the layer thickness as shown in Table 1. Specifically, 31 layers are made. As the odd number TiO$_2$ layers each having a refractive index of 2.35, provided are a $1^{st}$ layer having a thickness of 235 nm, a $3^{rd}$ layer having a thickness of 60 nm, a $5^{th}$ layer having a thickness of 65 nm, a $7^{th}$ layer having a thickness of 145 nm, a $9^{th}$ layer having a thickness of 130 nm, an $11^{th}$ layer having a thickness of 50 nm, a $13^{th}$ layer having a thickness of 60 nm, a $15^{th}$ layer having a thickness of 50 nm, a $17^{th}$ layer having a thickness of 55 nm, a $19^{th}$ layer having a thickness of 75 nm, a $21^{st}$ layer having a thickness of 50 nm, a $23^{rd}$ layer having a thickness of 40 nm, a $25^{th}$ layer having a thickness of 40 nm, a $27^{th}$ layer having a thickness of 50 nm, a $29^{th}$ layer having a thickness of 50 nm, and a $31^{st}$ layer having a thickness of 60 nm. As the even number SiO$_2$ layers each having a refractive index of 1.42, also provided are a $2^{nd}$ layer having a thickness of 75 nm, a $4^{th}$ layer having a thickness of 70 nm, a $6^{th}$ layer having a thickness of 80 nm, an $8^{th}$ layer having a thickness of 100 nm, a $10^{th}$ layer having a thickness of 95 nm, an $12^{th}$ layer having a thickness of 120 nm, a $14^{th}$ layer having a thickness of 95 nm, a $16^{th}$ layer having a thickness of 105 nm, an $18^{th}$ layer having a thickness of 125 nm, a $20^{th}$ layer having a thickness of 100 nm, a $22^{nd}$ layer having a thickness of 65 nm, a $24^{th}$ layer having a thickness of 80 nm, a $26^{th}$ layer having a thickness of 105 nm, a $28^{th}$ layer having a thickness of 185 nm, and a $30^{th}$ layer having a thickness of 80 nm. In addition, numeral 19 is designated as a PET film on which an Al film is evaporated.

Subsequently, PET film with an Al evaporated film (a refractive index of 1.52) 19 was attached to the reflective film so as to face the Al evaporated film on the surface side.

As shown in FIG. 8(c) and FIG. 8(d), a substrate is turned upside down, and placed on a substrate holder fitted with an electrostatic chuck for an evaporator. It is advantageous that a structure in which a conductive Al film is brought into contact with the substrate holder exhibits easy adsorption with a substrate, since static electricity is utilized in the case of the substrate holder fitted with an electrostatic chuck. After the substrate is placed in the evaporator, CsI:Tl as a phosphor material is deposited on the substrate via evaporation. Phosphor raw material CsI and TlI are first filled in a boat in a ratio of 1 mol %:0.03 mol %, for example. Next, after the inside of a vacuum chamber is evacuated once to introduce Ar gas, the inside of the vacuum chamber is made to be at a vacuum degree of 0.5 Pa. Herein, the substrate is heated approximately at 200° C. while rotating it, and the boat is heated up to approximately 710° C. to evaporate CsI and TlI. In this way, CsI columnar crystals each having a diameter of a few micron meters are deposited on the substrate to form a 600 µm thick film on the substrate. In the present embodiment, the substrate is to exhibit a transmitting property of light generated from phosphor, and CsI:Tl phosphor is deposited not on a multilayer dielectric film but on a polyimide substrate via evaporation. When CsI:Tl is deposited on a dielectric such as TiO$_2$ or the like, there appears a problem such as adhesion between the dielectric and CsI:Tl. In response, the dielectric may be subjected to a plasma treatment or a surface-roughening treatment to improve adhesion. However, when the dielectric mirror surface is subjected to the plasma treatment or the surface-roughening treatment, an optical path difference remains inconstant, and the interferential effect disappears since a roughened profile is generated on the surface, whereby high reflectivity is unobtainable. In order to avoid this, in the present invention, after a reflective film is provided on the reverse side of an optically transparent substrate, and the Cs:Tl formation side is placed for the polyimide substrate surface having been on the reverse side, the plasma treatment or the surface-roughening treatment is conducted to improve adhesion between the substrate and CsI:Tl. In this case, since no reflective film surface is damaged, high reflectivity at the reflective film can be maintained.

Finally, a lamination film of 20 µm thick PET/0.2 µm thick evaporated alumina/30 µm thick polypropylene having a total thickness of 50.2 µm is employed as each of external protective films 17A and 17B as shown in FIG. 8(e). The external protective film 17A end adheres to the external protective film 17B end via thermal compression bonding. The adhering portion is designated as external protective film connection portion 18.

The corrosion problem to be solved by the present invention is in the same case as described in the first embodiment. Since an excessive amount of I is contained in raw material evaporated to produce CsI phosphor, $I_2$ other than CsI is deposited around a substrate during film formation. The reason why $I_2$ is deposited around the substrate is that the $I_2$ melting point of 114° C. is lower than the CsI melting point of 621° C. Concerning CsI and $I_2$, $I_3^-$ ion is produced by the following chemical equation $CsI+I_2=Cs^++I_3^-$, via water penetration at high temperature and humidity (a temperature of 60° C. and a humidity of 70%), and Al is positively ionized via reaction with the metal reflective film conventionally made of Al to be dissolved out of the metal reflective film. Or, possibly, it is also assumed that a hydroxide ion is generated via reaction with a $H_2O$ molecule by ionizing I in such a way that $H_2O+I^- \rightarrow HI+OH^-$, and at this time, dissolution is generated in the following reaction such that $Al+3OH^-=Al(OH)_3$. However, no corrosion is generated since the reflective film of the present invention is composed of not a metal film but a multilayer dielectric film.

Further, in the present invention, since the reflective film ($TiO_2/SiO_2$ multilayer film) reflects only light emission of phosphor, strayed-in noise (stray light) and noise caused by fluorescence generated by impurities other than Tl are not reflected at the reflective film, whereby image noise can be suppressed. The present invention has the advantage that formation of a protective layer is also unnecessary, wherein the protective layer has originally been provided in order to protect the metal reflective film from corrosion caused by diffusion of phosphor halide atoms.

In the present embodiment, a multilayer structure composed of $TiO_2$ layers and $SiO_2$ layers is employed as the reflective film, but any material may be used as far as combination of a material having a high refractive index and a material having a low refractive index is concerned. As to the number of layers, at least a $TiO_2$ layer and a $SiO_2$ layer each may also be allowed to be used. Layer thickness of the $TiO_2$ layer and the $SiO_2$ layer each may be optimized by utilizing polyimide having a refractive index of 1.78 and PET having a refractive index of 1.52. Also in the present embodiment, polyimide is employed for a substrate, but other substrates, for example, resin substrates such as polyethylene terephthalate (PET) substrates or the like may be allowed to be used as far as the substrate transmitting light from phosphor, which exhibits radiotransparency is concerned. A metal substrate made of Al or the like in place of Al-evaporated PET may also be formed on a resin substrate. Corrosion resistance is possibly degraded in cases where these metal substrate and metal refractive layer are employed, but since the reflective film ($TiO_2/SiO_2$ multilayer film) reflects only light emission of phosphor, strayed-in noise (stray light) and noise caused by fluorescence generated by impurities other than Tl are not reflected at the reflective film, whereby it is advantageous that image noise can be suppressed. Further, reflectivity in this case which is higher than that of a metal layer alone is obtained, whereby it is advantageous that an image exhibiting high sensitivity can be acquired.

A scintillator panel for radiation in the present invention is also advantageous in view of productivity since the scintillator panel exhibits simple configuration in comparison to that of a scintillator panel for radiation in which a conventional metal plate is employed as a reflective film.

When the scintillator panel for radiation in the present invention is utilized, formed can be a flat panel detector exhibiting excellent radiation-light conversion efficiency as well as excellent durability, together with less noise.

Effect of the Invention

In the case of a scintillator panel of the present invention, generation of corrosion originated by metal is free from worry since a reflective film is composed of only a dielectric film, high durability is maintained, and only light emission of phosphor is reflected, and further, strayed-in noise (stray light) and noise caused by fluorescence generated by impurities other than Tl are not reflected at the reflective film, whereby image noise can be suppressed.

What is claimed is:

1. A scintillator panel for radiation comprising a radiotransparent resin substrate and provided thereon, a phosphor layer from which light is emitted by exposing the substrate to radiation and a reflective film at which light from the phosphor layer is reflected,
    wherein the reflective film is provided between the substrate and the phosphor layer, and is brought into direct contact with the phosphor layer, the reflective film comprising a multilayer film composed of at least two dielectric layers exhibiting a high reflectivity.

2. A flat panel detector comprising he scintillator panel of claim 1.

3. The scintillator panel of claim 1
    wherein the radiotransparent resin substrate is a radiotransparent polyimide substrate.

4. The scintillator panel of claim 1
    wherein the radiotransparent resin substrate is a radiotransparent polyethylene terephthalate substrate.

5. A scintillator panel for radiation comprising a radiotransparent substrate and provided thereon, a phosphor layer from which light is emitted by exposing the substrate to radiation and a reflective film at which light from the phosphor layer is reflected,
    wherein the reflective film is provided on a substrate surface side opposite the phosphor layer, the reflective film comprising a multilayer film composed of at least two dielectric layers exhibiting a high reflectivity.

6. The scintillator panel of claim 5,
    wherein the reflective film selectively reflects light having a wavelength of 350-800 nm.

7. The scintillator panel of claim 6,
    wherein the reflective film selectively reflects light having a wavelength of 400-700 nm.

8. A flat panel detector comprising the scintillator panel of claim 5.

* * * * *